United States Patent
Aoki et al.

(10) Patent No.: US 9,865,401 B2
(45) Date of Patent: Jan. 9, 2018

(54) METHOD FOR MANUFACTURING SOLID ELECTROLYTIC CAPACITOR, AND SOLID ELECTROLYTIC CAPACITOR

(71) Applicants: AVX CORPORATION; AVX TANTALUM ASIA CORPORATION, Shiga (JP)

(72) Inventors: Kiyofumi Aoki, Shiga Pref. (JP); Hiromasa Ageo, Shiga Pref. (JP); Junya Tatsuno, Shiga Pref. (JP); Koji Inazawa, Shiga Pref. (JP)

(73) Assignee: AVX Corporation, Fountain Inn, SC (US)

( * ) Notice: Subject to any disclaimer, the term of this patent is extended or adjusted under 35 U.S.C. 154(b) by 210 days.

(21) Appl. No.: 14/423,173

(22) PCT Filed: May 24, 2013

(86) PCT No.: PCT/JP2013/064501
§ 371 (c)(1),
(2) Date: Feb. 23, 2015

(87) PCT Pub. No.: WO2014/034201
PCT Pub. Date: Mar. 6, 2014

(65) Prior Publication Data
US 2015/0255223 A1  Sep. 10, 2015

(30) Foreign Application Priority Data
Aug. 30, 2012 (JP) .................................. 2012-189520

(51) Int. Cl.
*H01G 9/15* (2006.01)
*H01G 9/00* (2006.01)
(Continued)

(52) U.S. Cl.
CPC ............. *H01G 9/15* (2013.01); *H01G 9/0032* (2013.01); *H01G 9/0036* (2013.01); *H01G 9/028* (2013.01); *H01G 9/032* (2013.01)

(58) Field of Classification Search
CPC ...... H01G 9/15; H01G 9/0032; H01G 9/0036; H01G 9/028; H01G 9/032
(Continued)

(56) References Cited

U.S. PATENT DOCUMENTS 3,345,545 A   10/1967  Bourgault et al.
3,440,495 A   4/1969   Howard et al.
(Continued)

FOREIGN PATENT DOCUMENTS

GB   1069685      8/1965
JP   S 58199519   11/1983
(Continued)

OTHER PUBLICATIONS

Supplementary European Search Report dated Jun. 10, 2016, 6 pages.
(Continued)

*Primary Examiner* — Eric Thomas
*Assistant Examiner* — Michael P McFadden
(74) *Attorney, Agent, or Firm* — Dority & Manning, P.A.

(57) ABSTRACT

A method for manufacturing a solid electrolytic capacitor with excellent ESR properties and a solid electrolytic capacitor. A method for manufacturing a solid electrolytic capacitor, wherein an anode body is obtained by forming a dielectric oxide film on the surface of a sintered body that is formed by sintering a molded body formed of a valve acting metal powder or on the surface of a roughened valve acting metal foil, and a solid electrolyte layer is formed on the surface of the anode body. This method for manufacturing a solid electrolytic capacitor is characterized by steps for (Continued)

forming a solid electrolyte layer including a protrusion forming process where protrusions formed of manganese dioxide and having an average diameter of 10~102 nm are formed on the surface of the dielectric oxide coating film so that the protrusions are scattered about like islands and the surface coverage is 1~20% and a conductive polymer layer forming process where a conductive polymer layer is formed on the surfaces of the projections and the dielectric oxide coating film.

18 Claims, 3 Drawing Sheets

(51) Int. Cl.
　　　*H01G 9/02*　　　　(2006.01)
　　　*H01G 9/028*　　　(2006.01)
　　　*H01G 9/032*　　　(2006.01)
(58) Field of Classification Search
　　　USPC .......................................................... 361/524
　　　See application file for complete search history.

(56) References Cited

U.S. PATENT DOCUMENTS

| | | |
|---|---|---|
| 3,611,055 A | 10/1971 | Zeppieri et al. |
| 3,922,773 A | 12/1975 | Marien et al. |
| 4,017,302 A | 4/1977 | Bates et al. |
| 4,085,435 A | 4/1978 | Galvagni |
| 4,441,927 A | 4/1984 | Getz et al. |
| 4,479,168 A | 10/1984 | Green, Jr. |
| 4,483,819 A | 11/1984 | Albrecht et al. |
| 4,508,563 A | 4/1985 | Bernard et al. |
| 4,555,268 A | 11/1985 | Getz |
| 4,755,908 A | 7/1988 | Gardner |
| 4,910,645 A | 3/1990 | Jonas et al. |
| 4,943,892 A | 7/1990 | Tsuchiya et al. |
| 4,945,452 A | 7/1990 | Sturmer et al. |
| 4,959,430 A | 9/1990 | Jonas et al. |
| 4,960,471 A | 10/1990 | Fife et al. |
| 5,082,491 A | 1/1992 | Rerat |
| 5,111,327 A | 5/1992 | Blohm et al. |
| 5,198,968 A | 3/1993 | Galvagni |
| 5,232,169 A | 8/1993 | Kaneko et al. |
| 5,300,575 A | 4/1994 | Jonas et al. |
| 5,314,606 A | 5/1994 | Irie et al. |
| 5,357,399 A | 10/1994 | Salisbury |
| 5,394,295 A | 2/1995 | Galvagni et al. |
| 5,457,862 A | 10/1995 | Sakata et al. |
| 5,473,503 A | 12/1995 | Sakata et al. |
| 5,495,386 A | 2/1996 | Kulkarni |
| 5,522,558 A | 6/1996 | Kaneko |
| 5,586,000 A | 12/1996 | Sakata et al. |
| 5,608,261 A | 3/1997 | Bhattacharyya et al. |
| 5,638,253 A | 6/1997 | Hasegawa |
| 5,694,287 A | 12/1997 | Nishiyama et al. |
| 5,729,428 A | 3/1998 | Sakata et al. |
| 5,812,367 A | 9/1998 | Kudoh et al. |
| 5,949,639 A | 9/1999 | Maeda et al. |
| 5,951,840 A | 9/1999 | Fukaumi et al. |
| 5,954,856 A | 9/1999 | Pathare et al. |
| 6,052,273 A | 4/2000 | Inoue et al. |
| 6,126,097 A | 10/2000 | Chen et al. |
| 6,145,765 A | 11/2000 | Capelle, Jr. et al. |
| 6,191,936 B1 | 2/2001 | Webber et al. |
| 6,197,252 B1 | 3/2001 | Bishop et al. |
| 6,238,456 B1 | 5/2001 | Wolf et al. |
| 6,322,912 B1 | 11/2001 | Fife |
| 6,324,050 B1 | 11/2001 | Kobatake et al. |
| 6,369,239 B2 | 4/2002 | Rauchschwalbe et al. |
| 6,391,275 B1 | 5/2002 | Fife |
| 6,409,777 B2 | 6/2002 | Kobatake et al. |
| 6,416,730 B1 | 7/2002 | Fife |
| 6,445,566 B2 | 9/2002 | Watanabe et al. |
| 6,447,570 B1 | 9/2002 | Pozdeev-Freeman |
| 6,527,937 B2 | 3/2003 | Fife |
| 6,528,662 B2 | 3/2003 | Jonas |
| 6,576,038 B1 | 6/2003 | Rao |
| 6,576,099 B2 | 6/2003 | Kimmel et al. |
| 6,592,740 B2 | 7/2003 | Fife |
| 6,594,141 B2 | 7/2003 | Takada |
| 6,635,729 B1 | 10/2003 | Groenendaal et al. |
| 6,639,787 B2 | 10/2003 | Kimmel et al. |
| 6,674,635 B1 | 1/2004 | Fife et al. |
| 6,756,473 B2 | 6/2004 | Reuter et al. |
| 6,804,109 B1 | 10/2004 | Hana et al. |
| 6,864,147 B1 | 3/2005 | Fife et al. |
| 6,891,016 B2 | 5/2005 | Reuter et al. |
| 6,987,663 B2 | 1/2006 | Merker et al. |
| 7,102,016 B2 | 9/2006 | Reuter |
| 7,116,548 B2 | 10/2006 | Satterfield, Jr. et al. |
| 7,118,690 B2 | 10/2006 | Wessling et al. |
| 7,154,740 B2 | 12/2006 | Merker et al. |
| 7,220,397 B2 | 5/2007 | Kimmel et al. |
| 7,221,554 B2* | 5/2007 | Brenneman .......... H01G 9/0036 252/62.2 |
| 7,262,511 B2 | 8/2007 | Osaka et al. |
| 7,279,015 B2 | 10/2007 | Merker |
| 7,304,832 B2 | 12/2007 | Ushio et al. |
| 7,312,979 B2 | 12/2007 | Ishizuka et al. |
| 7,341,705 B2 | 3/2008 | Schnitter |
| 7,341,801 B2 | 3/2008 | Reuter et al. |
| 7,358,326 B2 | 4/2008 | Heuer et al. |
| 7,377,947 B2 | 5/2008 | Merker et al. |
| 7,381,396 B2 | 6/2008 | Thomas et al. |
| 7,411,779 B2 | 8/2008 | Merker et al. |
| 7,419,926 B2 | 9/2008 | Schnitter et al. |
| 7,449,588 B2 | 11/2008 | Jonas et al. |
| 7,468,882 B2 | 12/2008 | Marek et al. |
| 7,515,396 B2 | 4/2009 | Biler |
| 7,554,793 B2 | 6/2009 | Chacko |
| 7,563,290 B2 | 7/2009 | Qiu et al. |
| 7,582,958 B2 | 9/2009 | Brailey |
| 7,585,983 B2 | 9/2009 | Reuter et al. |
| 7,602,600 B1 | 10/2009 | Itoh |
| 7,679,885 B2 | 3/2010 | Mizusaki et al. |
| 7,688,571 B2 | 3/2010 | Ishizuka et al. |
| 7,697,265 B2 | 4/2010 | Umemoto et al. |
| 7,729,103 B2 | 6/2010 | Kato et al. |
| 7,750,099 B2 | 7/2010 | Chikusa et al. |
| 7,785,493 B2 | 8/2010 | Jonas et al. |
| 7,883,796 B2 | 2/2011 | Kida et al. |
| 7,948,069 B2 | 5/2011 | Zhuang |
| 7,972,534 B2 | 7/2011 | Merker et al. |
| 7,973,180 B2 | 7/2011 | Morita et al. |
| 7,988,743 B2 | 8/2011 | Shimamoto et al. |
| 7,994,345 B2 | 8/2011 | Brassat et al. |
| 8,058,135 B2 | 11/2011 | Merker et al. |
| 8,094,434 B2 | 1/2012 | Rawal et al. |
| 8,310,815 B2 | 11/2012 | Freeman et al. |
| 8,313,538 B2 | 11/2012 | Merker et al. |
| 8,349,683 B2 | 1/2013 | Natio |
| 8,512,422 B2 | 8/2013 | Pinwill et al. |
| 8,619,410 B2 | 12/2013 | Pinwill et al. |
| 8,747,489 B2 | 6/2014 | Pinwill et al. |
| 8,808,403 B2 | 8/2014 | Qiu et al. |
| 8,824,122 B2 | 9/2014 | Vilc et al. |
| 9,373,448 B2 | 6/2016 | Majima et al. |
| 2003/0003235 A1* | 1/2003 | Shiho ..................... C01G 35/00 427/376.2 |
| 2004/0231119 A1 | 11/2004 | Brenneman et al. |
| 2005/0065352 A1 | 3/2005 | Brassat et al. |
| 2005/0164508 A1* | 7/2005 | Brenneman .......... H01G 9/0036 438/689 |
| 2005/0248910 A1* | 11/2005 | Merker .................. H01G 9/028 361/525 |
| 2006/0260713 A1 | 11/2006 | Pyszczek et al. |
| 2007/0002526 A1* | 1/2007 | Naito ..................... H01G 9/0032 361/523 |
| 2008/0232036 A1* | 9/2008 | Kato ..................... H01G 9/0036 361/525 |

(56) References Cited

U.S. PATENT DOCUMENTS

| | | | |
|---|---|---|---|
| 2008/0247120 A1* | 10/2008 | Mori | H01G 9/0425 361/523 |
| 2009/0310285 A1 | 12/2009 | Reuter et al. | |
| 2010/0148124 A1 | 6/2010 | Reuter et al. | |
| 2011/0317335 A1* | 12/2011 | Pinwill | H01G 9/0036 361/525 |
| 2014/0334067 A1 | 11/2014 | Aoki et al. | |
| 2014/0334068 A1 | 11/2014 | Aoki et al. | |
| 2014/0334069 A1 | 11/2014 | Petzilek et al. | |

FOREIGN PATENT DOCUMENTS

| | | |
|---|---|---|
| JP | 3127813 | 5/1991 |
| JP | 11112157 | 4/1999 |
| JP | 2005217129 | 8/2005 |
| JP | 2006278875 | 10/2006 |
| JP | 2012189520 | 8/2012 |
| WO | WO 2008003938 | 1/2008 |
| WO | WO 2009030615 | 3/2009 |
| WO | WO 2009043648 | 4/2009 |
| WO | WO 2009047059 | 4/2009 |
| WO | WO 2009135752 | 11/2009 |
| WO | WO 2009141209 | 11/2009 |
| WO | WO 2010003874 | 1/2010 |
| WO | WO 2010015468 | 2/2010 |
| WO | WO 2010089111 | 8/2010 |
| WO | WO 2010102751 | 9/2010 |

OTHER PUBLICATIONS

Abstract of Japanese Patent—JPH01183806, Jul. 21, 1989, 1 page.
Abstract of Japanese Patent No. JP1140621 dated Jun. 1, 1989.
Abstract of Japanese Patent No. JPH0396210, Apr. 22, 1991, w pages.
Abstract of Japanese Patent No. JP3109712 dated May 9, 1991.
Abstract of Japanese Patent No. JP3109713 dated May 9, 1991.
Abstract of Japanese Patent No. JP3109714 dated May 9, 1991.
Abstract of Japanese Patent No. JP2924310 dated Jul. 26, 1999, 2 pages.
Machine Translation of JP2005217129, 11 pages.
Machine Translation of JP2006278875, 8 pages.
Machine Translation of JP 2005039168, Oct. 2, 2005, 17 pages.
Abstract of WO Patent No. 2014034201, Mar. 6, 2014, 2 pages.
Article—Freeman et al, "Stable, Reliable, and Efficient Tantalum Capacitors," *Carts USA 2008*, 28th Symposium for Passive Electronics, Mar. 2008, Newport Beach, California, 6 pages.
Article—Freeman et al., "Electrical Characterization of Polymer Tantalum Capacitors with Poly(3,4-ethylenedioxythiophene) Cathode," *CARTS Europe 2008*, Oct. 20-23, 2008, in Helsinki, Finland, 9 pages.
Article—Freeman et al., "Reliability and Critical Applications of Tantalum Capacitors," *CARTS Europe 2007*, Oct.-Nov. 2007, Barcelona, Spain, pp. 193-204.
Article—Pozdeev-Freeman, et al., "Critical oxygen content in porous anodes of solid tantalum capacitors," *Journal of Materials Science in Electronics*, vol. 9, 1998, pp. 309-311.
Article—Simkins et al., "Tantalum Powders for High Voltage Applications II," *CARTS 2004*, 24th Annual Capacitor and Resistor Technology Symposium, Mar. 29, Apr. 1, 2004, pp. 47-54.
Paper—Merker et al., "Conducting Poiymer Dispersions for High-Capacitance Tantalum Capacitors,": CARTS Europe 2006, Sep. 2006, Bad Homburg, Germany, 6 pages.
Paper—Merker et al., "New Conducting Polymer Dispersions for Solid Electrolytic Capacitors," CARTS Europe 2005, Oct. 17-20, 2005, Prague, CZ Republic, 6 pages.
Paper—Merker et al., "Tuning Conducting Polymer Dispersions for High-CV Tantalum Capacitors," CARTS Europe Oct. 29-Nov. 1, 2007, Barcelona, Spain, 6 pages.
Paper—Simpson et al., "Advances and Applications of Inherently Conductive Polymer Technologies Based on Poly(3,4-Ethylenedioxythrophene)," 2005 AIMCAL Fall Technical Conference and 19th International Vacuum Web Coating Conference, Oct. 16-20, 2005, Session 5: Advances in Technology, Myrtle Beach, SC, 10 pages.
Paper—Young et al., "Performance and Reliability Study of High Voltage Tantalum Polymer Capacitors," 2010 Electronic Components Association, Inc., Arlington, VA; CARTS 2010 Conference Proceedings, CARTS 2010 Conference, New Orleans, LA, Apr. 2010, 13 pages.
Presentation—Freeman et al., "Hermetically Sealed Polymer Tantalum Capacitors," CMSE Europe 2010.
Abstract of Japanese Patent—JPH0396210, Apr. 22, 1991, 2 pages.
Abstract of Japanese Patent—JPH0669082 Mar. 11, 1994, 2 pages.
Abstract of Japanese Patent—JP2006147900, Jun. 8. 2006, 2 pages.
International Search Report for PCT/JP2013/064501 dated Aug. 13, 2013, 1 page.
Abstract of Japanese Patent—JPH0722285, Jan. 24, 1995, 2 pages.
Abstract of Japanese Patent—JP2006351609, Dec. 28, 2006, 2 pages.
Examination Report for GB1407649.1 dated Aug. 25, 2017, 4 pages.
Examination Report for GB1407648.3 dated Sep. 6, 2017, 5 pages.

* cited by examiner

[Figure 1]
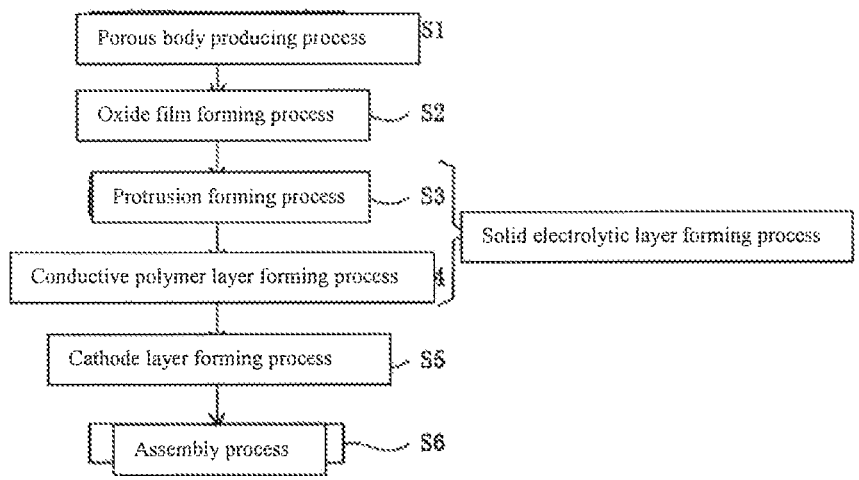
[Figure 2]
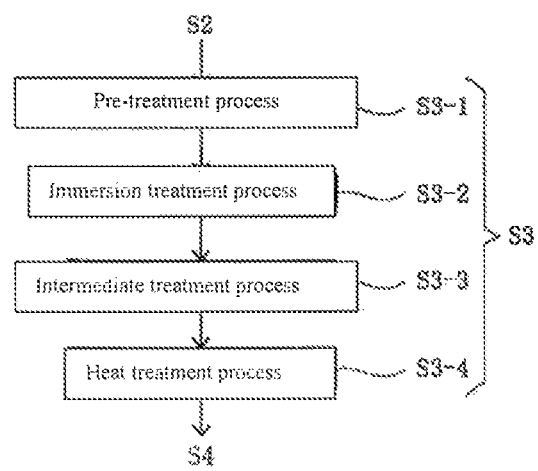

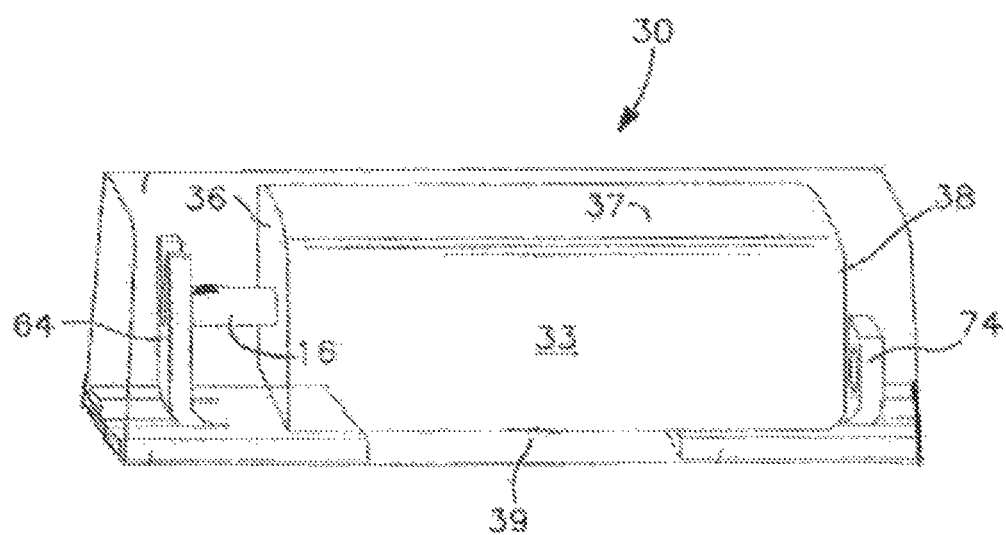
FIG. 3
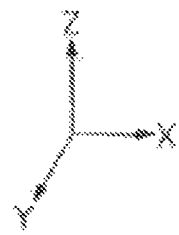

METHOD FOR MANUFACTURING SOLID ELECTROLYTIC CAPACITOR, AND SOLID ELECTROLYTIC CAPACITOR

CROSS REFERENCE TO RELATED APPLICATION

This application is the national stage entry of International Patent Application No. PCT/JP2013/064501 having a filing date of May 24, 2013, which claims priority to and the benefit of Japanese Patent Application No. 2012-189520 filed in the Japanese Intellectual Property Office on Aug. 30, 2012, the entire contents of which are incorporated herein by reference.

TECHNICAL FIELD

The present invention relates to a method for manufacturing a solid electrolytic capacitor and a solid electrolytic capacitor.

PRIOR ART

A method for manufacturing a solid electrolytic capacitor using only manganese dioxide as the solid electrolyte, a method for manufacturing a solid electrolytic capacitor using only a conductive polymer as the solid electrolyte, and a method for manufacturing a solid electrolytic capacitor using manganese dioxide and a conductive polymer (for example, refer to patent literature 1~3) are conventionally well known.

Referring to FIG. 3, one embodiment of an electrolytic capacitor 30 is shown that includes an anode terminal 64, a cathode terminal 74, and a capacitor element 33. The capacitor element 33 has an upper surface 37, lower surface 39, front surface 36, and rear surface 38. The anode terminal 64 is connected to an anode lead 16.

In patent literature 1, a method for manufacturing a solid electrolytic capacitor is disclosed wherein after forming a conductive polymer in the form of islands on the surface of a dielectric oxide film, a manganese dioxide layer is formed on the entire surface of the dielectric oxide film to cover this conductive polymer.

According to this method of manufacture, since a conductive polymer with a higher conductivity than the manganese dioxide is formed on the surface of the dielectric oxide film, it is possible to prepare a solid electrolytic capacitor with excellent ESR properties that are better than a solid electrolytic capacitor using only manganese dioxide as the solid electrolyte. Also, with this method of manufacture, since manganese dioxide with good adhesion with the dielectric oxide film is formed on the entire surface of the dielectric oxide film to cover this conductive polymer with islands, it is possible to improve the adhesion between the conductive polymer and the dielectric oxide film.

In patent literature 2, a method for manufacturing a solid electrolytic capacitor is disclosed wherein after forming a manganese dioxide layer with a thickness of 1 μm or more on the entire surface of a dielectric oxide film, a conductive polymer layer is formed on the surface of the manganese dioxide layer by chemical bonding using an oxidizing agent.

With this method of manufacture, since a manganese dioxide layer is formed on the entire surface of the dielectric oxide film, it is possible to prevent damage to the dielectric oxide film when the dielectric oxide film is directly exposed to oxygen during chemical bonding.

In patent literature 3, a method for manufacturing a solid electrolytic capacitor is disclosed wherein the anode formed on the manganese dioxide layer on the entire surface of the dielectric, oxide film is immersed in an aqueous suspension where a conductive polymer powder is suspended, and a conductive polymer layer is formed on the surface of the manganese dioxide layer.

With this method of manufacture, since a conductive polymer layer is uniformly formed on the surface of the manganese dioxide layer with sufficient thickness by immersion in the aqueous suspension, it is possible to prevent a deterioration in the ESR properties and the leakage current characteristics from damage to the manganese dioxide layer or dielectric oxide film due to thermal stress during mounting.

LITERATURE ON PRIOR ART

Patent Literature

Patent Literature 1: Official gazette for Kokai 2008-263167
Patent Literature 2: Official gazette for Kokai H6-69082
Patent Literature 3: Official gazette for Kokai 2006-147900

SUMMARY OF THE INVENTION

Problems the Invention is to Solve

However, the solid electrolytic capacitor produced according to the method of manufacture set forth in the abovementioned Patent Literature 1 is manufactured by forming a manganese dioxide layer over the entire surface of a dielectric oxide film to cover the islands of conductive polymer so when compared to a solid electrolytic capacitor using only a conductive polymer on a solid electrolyte, the ESR properties become inferior. Furthermore, with this method of manufacture, the manganese dioxide layer is formed after forming the island shaped conductive polymer so the islands of conductive polymer ends up being inferior due to the heat treatment performed while forming the manganese dioxide layer, so the ESR properties deteriorate even further.

Additionally, with the solid electrolytic capacitor produced according to the method of manufacture set forth in the abovementioned Patent Literature 2, a manganese dioxide layer with a thickness of 1 μm or more is formed between the dielectric oxide film and the conductive polymer layer so when compared to a solid electrolytic capacitor using only a conductive polymer on a solid electrolyte, the ESR properties become inferior.

With the solid electrolytic capacitor produced according to the method of manufacture set forth in the abovementioned Patent Literature 3, a manganese dioxide layer is also formed over the entire surface of a dielectric oxide film so when compared to a solid electrolytic capacitor using only a conductive polymer on a solid electrolyte, the ESR properties become inferior. Also, in general, since the particle diameters of the conductive polymer in an aqueous solution are relatively large, there is a concern that the conductive polymer will not extend to the inside of the anode body. Therefore, the contact portion of the conductive polymer layer and the manganese dioxide layer is reduced, and there is a concern that the ESR properties will deteriorate even further.

That is to say, the solid electrolytic capacitor produced according to the method of manufacture set forth in the abovementioned Patent Literatures 1~3, all have the benefit of forming a manganese dioxide layer but have the problem of inferior ESR properties when compared to a solid electrolytic capacitor using only a conductive polymer on a solid electrolyte.

The present invention has studied the aforementioned facts and presents a method for manufacturing a solid electrolytic capacitor and a solid electrolytic capacitor with excellent ESR properties.

Means of Solving These Problems

To solve the abovementioned problems, a method for manufacturing a solid electrolytic capacitor, wherein an anode body is obtained by forming a dielectric oxide film on the surface of a sintered body that is formed by sintering a molded body formed of a valve acting metal powder or on the surface of a roughened valve acting metal foil, wherein the processes forming the solid electrolytic layer comprising a protrusion forming process wherein protrusions formed of manganese dioxide and having an average diameter of 10~102 nm are formed on the surface of the dielectric oxide coating film so that the projections are scattered like islands and the surface coverage is 1~20%, and a conductive polymer layer forming process wherein a conductive polymer layer is formed on the surfaces of the protrusions and the dielectric oxide coating film.

With this configuration, since the protrusions are formed of manganese dioxide and scattered in the shape of islands on the surface of the dielectric oxide film, it is possible for the conductive polymer layer to come into contact with the dielectric oxide film between the protrusions. Therefore, with this configuration, by using manganese dioxide, a deterioration of the ESR properties can be inhibited.

Additionally, with this configuration, the plurality of protrusions formed on the surface of the dielectric oxide film during formation of the conductive polymer layer are in a state of getting stuck in the conductive polymer layer so it is possible to improve the adhesion between the dielectric oxide film and the conductive polymer layer. Furthermore, with this configuration, the ESR properties can be improved and it is possible to prevent a deterioration of the ESR properties and the leakage current characteristics when the conductive polymer layer delaminates from the dielectric oxide film due to thermal stress and such.

Furthermore, with this configuration, when forming the conductive polymer layer with chemical polymerization, since the amount of polymerization solution retained increases due to the plurality of protrusions, it is possible to improve the capacitance emergence rate (internal impregnating ability). Additionally, with this configuration, a large capacity solid electrolytic capacitor is easily formed, and it is possible to reduce the number of immersions in a polymerization solution.

In the present invention, "average diameter" refers to the average value of the major axis (maximum diameter) of the protrusions with a planar view.

In the abovementioned (1) method of manufacture, for example, the (2) protrusion formation process includes a pretreatment process to leave the anode body in a humid environment with a humidity of 8 $g/m^3$ or greater, an immersion treatment process to immerse the anode body in a manganese nitrate solution after the pretreatment process, an intermediate treatment process to leave the anode body in a humid environment with a humidity of 8 $g/m^3$ or greater after the immersion treatment process and a heat treatment process for a pyrolyzing reaction of the anode body in an environment of a specific relative humidity after the intermediate treatment process.

In the abovementioned (2) method of manufacture, it is preferred that a surfactant be added to the (3) manganese nitrate solution.

With this configuration, since it is possible to lower the surface tension with the surfactant, it is possible to improve the internal impregnating ability of the manganese nitrate.

In the abovementioned (2) or (3) methods of manufacture, for example, it is possible for the (4) specific relative humidity to be 50~80%.

In the abovementioned (1)~(4) methods of manufacture, it is also acceptable to conduct a reforming process between the (5) protrusion formation process and the conductive polymer layer formation process in order to re-form the dielectric oxide film.

With this configuration, since the defects in the dielectric oxide film are repaired with the re-forming process, it is possible to improve the leakage current characteristics.

In the abovementioned (1)~(5) methods of manufacture, it is preferred that the conductive polymer layer be formed with chemical polymerization in the (6) conductive polymer layer formation process.

Also, to solve the abovementioned problems, the solid electrolytic capacitor pertaining to the present invention is (7) a solid electrolytic capacitor, wherein a dielectric oxide film is formed on the surface of a sintered body that is formed by sintering a molded body formed of a valve acting metal powder or on the surface of a roughened valve acting metal foil, and a solid electrolyte layer is formed on the surface of the dielectric, oxide film, wherein the solid electrolytic layer is formed with island shapes scattered on the surface of the dielectric oxide film so the surface coverage is 1~20%, and there are a plurality of protrusions of manganese dioxide having average diameters of 10~102 nm, and a conductive polymer layer formed on the surfaces of the protrusions and the dielectric oxide film.

With this configuration, since the conductive polymer layer comes into contact with the dielectric oxide film in between the protrusions of manganese dioxide, it is possible to prevent a deterioration in the ESR properties by using the manganese dioxide.

Also, with this configuration, the plurality of protrusions formed on the surface of the dielectric oxide film are stuck in the conductive polymer layer and the adhesion between the dielectric oxide film and the conductive polymer layer is improved so the ESR properties can be improved, and it is possible to prevent a deterioration of the ESR properties and the leakage current characteristics when the conductive polymer layer delaminates from the dielectric oxide film due to thermal stress and such.

Also, with this configuration, when forming the conductive polymer layer with chemical polymerization, since the amount of polymerization solution retained increases due to the plurality of protrusions, it is possible to improve the capacitance emergence rate (internal impregnating ability), and as a result, it is possible to improve the capacitance.

BRIEF DESCRIPTION OF THE FIGURES

FIG. 1 A flow chart of the method for manufacturing a solid electrolytic capacitor pertaining to an embodiment of the present invention.

FIG. 2 A flow chart of the protrusion formation process in the present invention.

FIG. 3 A schematic illustration of one embodiment of a capacitor that may be formed in accordance with the present invention.

MODE FOR CARRYING OUT THE INVENTION

Figure 4:
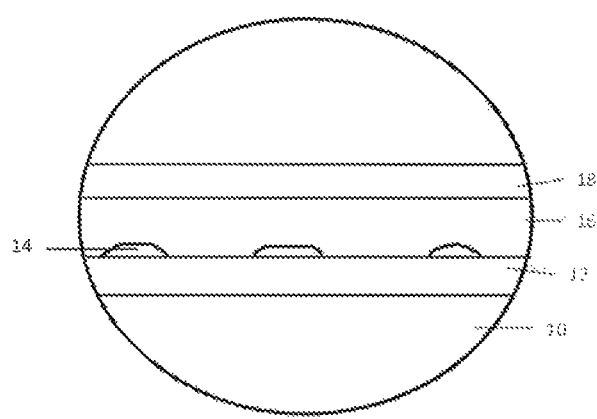
FIG. 4 A cross-sectional illustration of a portion of a capacitor that may be formed in accordance with the present invention.

Next is a description of the preferred embodiments for the method for manufacturing a solid electrolytic capacitor and a solid electrolytic capacitor pertaining to the present invention.

Embodiment 1

FIG. 1 shows the method for manufacturing a solid electrolytic capacitor pertaining to the present invention. As shown in the same drawing, first, the porous body production process (S1) and the oxide film formation process (S2) are performed in this embodiment.

In the porous body production process (S1), an anode lead is embedded in tantalum powder and after press formation, a 1.0 mm×1.5 mm×0.5 mm sintered rectangular porous body (sintered body) was produced.

In the oxide film formation process (S2), the anode oxide porous body produced with the porous body production process (S1) is subject to applied voltage of 10V in a phosphate solution, and a dielectric oxide film was formed on the surface of the porous body. In this manner, the anode body was prepared.

Next, the process forming the solid electrolyte layer (solid electrolyte formation process) includes a protrusion forming process (S3) to form protrusions of manganese dioxide on the surface of a dielectric oxide film such that the protrusions are scattered in the shape of islands and a conductive polymer layer forming process (S4) to form a conductive polymer layer on the surfaces of the protrusions and the dielectric oxide film. Furthermore, the plurality of protrusions and the conductive polymer layer of manganese dioxide correspond to the "solid electrolyte layer" in the present invention.

During the protrusion forming process (S3), the pretreatment process (S3-1), immersion treatment process (S3-2), intermediate treatment process (S3-3) and heat treatment process (S3-4) are performed in this sequence, as shown in FIG. 2.

During the pretreatment process (S3-1), the anode body prepared with the oxide film forming process (S2) was left for 30 minutes in a humid environment with a temperature of 30° C. and a humidity of 8 g/m³.

During the immersion treatment process (S3-2), the anode body after the pretreatment process (S3-1) was immersed in a manganese nitrate solution with a manganese nitrate concentration of 20 wt %. A wt % surfactant of polyoxyethylene alkyl ether was added to the manganese nitrate solution.

During the intermediate treatment process (S3-3), after the immersion treatment process (S3-2), the anode body was again left for 30 minutes in a humid environment with a temperature of 30° C. and a humidity of 8 g/m³.

During the heat treatment process (S3-4), after the intermediate treatment process (S3-3), the anode body was heat treated in an environment with a temperature of 250° C. and a relative humidity of 80%, where the manganese nitrate adhering to the surface of the dielectric oxide film was pyrolyzed and protrusions of manganese dioxide were formed and scattered like islands. To be more specific, the surface coverage of all of the protrusions on the dielectric oxide film surface was 10%, and the average diameter of the protrusions was 10 nm.

The surface coverage here indicates the ratio of the surface coverage to the dielectric oxide film of the protrusions of manganese dioxide formed on the surface of the dielectric oxide film. To be more specific, this was calculated from the capacitance (capacitance originally with these capacitor elements: capacitance A) after sufficiently including the conductive solution in the capacitor element after forming the protrusions of manganese dioxide and the capacitance after washing the conductive solution from the abovementioned capacitor element and sufficiently drying off the moisture (capacitance actually with these capacitor elements after formation of the protrusions of manganese dioxide: capacitance B).

Next is the formula to calculate the surface coverage.

$$\text{Surface Coverage} = \frac{\text{Capacitance actually with these capacitor elements (capacitance } B\text{)}}{\text{Capacitance originally with these capacitor elements (capacitance } A\text{)}} \times 100\% \quad \text{[Formula 1]}$$

During the conductive polymer layer forming process (S4), a monomer solution containing 3,4-ethylene dioxythiophene and an oxidizing agent solution containing iron (II) p-toluenesulfonic acid were combined and after the protrusion forming process (S3), the anode body was immersed in the mixed solution (polymerization solution) maintained at a temperature of −5° C., and then after lifting it out, was chemically polymerized at a temperature of 25° C. In this embodiment, a conductive polymer layer was formed by repeating the conductive polymer layer forming process (S4) a total of 7°.

During the conductive polymer layer forming process (S4), since a product with oxidizability that is stronger than manganese dioxide was used as the oxidizing agent containing an oxidizing agent solution (iron (II) p-toluenesulfonic acid in this embodiment), it can be said that there is essentially no cost reduction with manganese dioxide as the oxidizing agent for the protrusions during chemical polymerization.

Next, the cathode layer forming process (S5) was conducted by coating a carbon paste or a silver paste on the surface of the conductive polymer layer formed in the conductive polymer layer forming process (S4) then drying to form a cathode layer comprising a carbon layer or a silver layer.

Finally, an assembly process (S6) was conducted by connecting the cathode terminal to the surface of the cathode layer, and after connecting the anode terminal to the anode lead protruding from the anode body, and a sheathing resin was implemented with a transfer mold to produce a solid electrolytic capacitor with a rating of 4V-100 μF (2012 size).

Embodiment 2

With Embodiment 2 in the present invention, (1) the manganese nitrate concentration in the manganese nitrate solution used during the immersion treatment process (S3-2) is 5 wt % and (2) the relative humidity for the heat treatment process (S3-4) is 70% but otherwise, it is the same as the method for manufacturing a solid electrolytic capacitor pertaining to Embodiment 1. In this embodiment, the surface coverage for all of the protrusions is 1% that of the dielectric oxide film surface, and the average diameter of the protrusions is 48 nm.

Embodiment 3

The method for manufacturing a solid electrolytic capacitor pertaining to Embodiment 3 in the present invention has a relative humidity for the heat treatment process (S3-4) that is 70% but otherwise, it is the same as the method for manufacturing a solid electrolytic capacitor pertaining to Embodiment 1. In this embodiment, the surface coverage for all of the protrusions is 10% that of the dielectric oxide film surface, and the average diameter of the protrusions is 51 nm.

Embodiment 4

The method for manufacturing a solid electrolytic capacitor pertaining to Embodiment 4 in the present invention (1) does not add a surfactant to the manganese nitrate used in the immersion treatment process (S3-2), and (2) has a relative humidity for the heat treatment process (S3-4) that is 70% but otherwise, it is the same as the method for manufacturing a solid electrolytic capacitor pertaining to Embodiment 1. In this embodiment, the surface coverage for all of the protrusions is 9% that of the dielectric oxide film surface, and the average diameter of the protrusions is 50 nm.

Embodiment 5

The method for manufacturing a solid electrolytic capacitor pertaining to Embodiment 5 in the present invention (1) has a relative humidity for the heat treatment process (S3-4) that is 70% and (2) performs a re-forming process one time between the protrusion forming process (S3) and the conductive polymer layer forming process (S4) but otherwise, it is the same as the method for manufacturing a solid electrolytic capacitor pertaining to Embodiment 1. During the re-forming process, anode oxidation is performed in a phosphate solution at an applied voltage of 8V to re-form the dielectric oxide film. In this embodiment, the surface coverage for all of the protrusions is 10% that of the dielectric, oxide film surface, and the average diameter of the protrusions is 51 nm.

Embodiment 6

The method for manufacturing a solid electrolytic capacitor pertaining to Embodiment 6 in the present invention (1) has a relative humidity for the heat treatment process (S3-4) that is 70% and (2) performs the protrusion forming process (S3) a total of two times but otherwise, it is the same as the method for manufacturing a solid electrolytic capacitor pertaining to Embodiment 1. In this embodiment, the surface coverage for all of the protrusions is 20% that of the dielectric oxide film surface, and the average diameter of the protrusions is 54 nm.

Embodiment 7

The method for manufacturing a solid electrolytic capacitor pertaining to Embodiment 7 in the present invention has a relative humidity for the heat treatment process (S3-4) that is 50% but otherwise, it is the same as the method for manufacturing a solid electrolytic capacitor pertaining to Embodiment 1. In this embodiment, the surface coverage for all of the protrusions is 11% that of the dielectric oxide film surface, and the average diameter of the protrusions is 102 nm.

CONVENTIONAL EXAMPLES

The method for manufacturing a solid electrolytic capacitor for the conventional example (1) does not perform the protrusion forming process (S3) and (2) performs the conductive polymer layer forming process (S4) a total of 10 times, but otherwise, it is the same as the method for manufacturing a solid electrolytic capacitor pertaining to Embodiment 1.

Comparative Example 1

The method for manufacturing a solid electrolytic capacitor for comparative example 1 does not perform the protrusion forming process (S3) but otherwise, it is the same as the method for manufacturing a solid electrolytic capacitor pertaining to Embodiment 1. In other words, the method for manufacturing a solid electrolytic capacitor for comparative example 1 performs the conductive polymer layer forming process (S4) a total of 10 times, but otherwise, it is the same as the method for manufacturing a solid electrolytic capacitor pertaining to the conventional example.

Comparative Example 1

The method for manufacturing a solid electrolytic capacitor for comparative example 2 has a relative humidity for the heat treatment process (S3-4) that is 90% but otherwise, it is the same as the method for manufacturing a solid electrolytic capacitor pertaining to Embodiment 1. In comparative example 2, the surface coverage for all of the protrusions is 10% that of the dielectric oxide film surface, and the average diameter of the protrusions is 5 nm.

Comparative Example 3

The method for manufacturing a solid electrolytic capacitor for comparative example 3 (1) has a relative humidity for the heat treatment process (S3-4) that is 70% and (2) performs the protrusion forming process (S3) a total of three times but otherwise, it is the same as the method for manufacturing a solid electrolytic capacitor pertaining to Embodiment 1. In comparative example 3, the surface coverage for all of the protrusions is 29% that of the dielectric oxide film surface, and the average diameter of the protrusions is 57 nm.

Comparative Example 4

The method for manufacturing a solid electrolytic capacitor for comparative example 4 has a relative humidity for the heat treatment process (S3-4) that is 20% but otherwise, it is the same as the method for manufacturing a solid electrolytic capacitor pertaining to Embodiment 1. In comparative example 4, the surface coverage for all of the protrusions is 11% that of the dielectric oxide film surface, and the average diameter of the protrusions is 160 nm.

The key manufacturing conditions for the method for manufacturing a solid electrolytic capacitor in Embodiments 1~7, the conventional example and comparative examples 1~4 are summarized as shown in Table 1.

TABLE 1

|  | Manganese Nitrate Concentration (wt %) | Addition of a Surfactant to the Manganese Nitrate Solution | Relative Humidity (%) | # of Times for the Protrusion Forming Process (times) | Re-forming Process |
|---|---|---|---|---|---|
| Embodiment 1 | 20 | Yes | 80 | 1 | — |
| Embodiment 2 | 5 | Yes | 70 | 1 | — |
| Embodiment 3 | 20 | Yes | 70 | 1 | — |
| Embodiment 4 | 20 | — | 70 | 1 | — |
| Embodiment 5 | 20 | Yes | 70 | 1 | Yes |
| Embodiment 6 | 20 | Yes | 70 | 2 | — |
| Embodiment 7 | 20 | Yes | 50 | 1 | — |
| Conventional Example | No protrusion forming process, conductive polymer layer forming process performed 10 times | | | | |
| Comparative Example 1 | Conductive polymer layer forming process performed 7 times, otherwise the same conditions as the conventional example | | | | |
| Comparative Example 2 | 20 | Yes | 90 | 1 | — |
| Comparative Example 3 | 20 | Yes | 70 | 3 | — |
| Comparative Example 4 | 20 | Yes | 20 | 1 | — |

The values for the average protrusion diameter, surface coverage for the protrusions, capacitance, ESR, leaked current, ESR after heat resistance testing and the leaked current after heat resistance testing for each solid electrolytic capacitor produced with the method for manufacturing a solid electrolytic capacitor in Embodiments 1~7, the conventional example and comparative examples 1~4 are shown in Table 2. The values shown in Table 2 are all average values for 12 solid electrolytic capacitors. Also, the heat resistance testing shown in Table 2 conducted reflow for 10 seconds at a temperature of 240° C.

manganese dioxide on the surface of the dielectric oxide film that are scattered about like islands so it is possible to have the conductive polymer layer contact the dielectric oxide film between the protrusions and thus it is possible to suppress the deterioration of ESR properties due to the use of manganese dioxide. Furthermore, with the method for manufacturing in Embodiments 1~7, since a plurality of protrusions formed on the surface of the dielectric oxide film when forming the conductive polymer layer are in a state stuck in the conductive polymer layer, it is thought that the

TABLE 2

|  | Average Diameter of the Protrusions (nm) | Surface Coverage of the Protrusions (%) | Capacitance (μF at 120 Hz) | ESR (mΩ at 100 kHz) | Leaked Current (μA at 4 V 1 min) | ESR after Heat Resistance Testing (mΩ at 100 kHz) | Leaked Current after Heat Resistance Testing (μA at 4 V 1 min) |
|---|---|---|---|---|---|---|---|
| Comparative Example 1 | — | — | 85.5 | 107 | 9.2 | 135 | 12.2 |
| Conventional Example | — | — | 91.5 | 97 | 3.2 | 113 | 6.2 |
| Comparative Example 2 | 5 | 10 | 91.9 | 96 | 3.0 | 110 | 6.0 |
| Embodiment 1 | 10 | 10 | 98.0 | 89 | 2.8 | 92 | 3.5 |
| Embodiment 2 | 48 | 1 | 94.9 | 90 | 3.0 | 98 | 3.8 |
| Embodiment 3 | 51 | 10 | 98.1 | 86 | 2.9 | 89 | 3.2 |
| Embodiment 4 | 50 | 9 | 94.9 | 93 | 3.0 | 99 | 3.9 |
| Embodiment 5 | 51 | 10 | 98.8 | 84 | 1.5 | 86 | 1.5 |
| Embodiment 6 | 54 | 20 | 98.0 | 89 | 2.6 | 93 | 2.8 |
| Comparative Example 3 | 57 | 29 | 97.8 | 119 | 1.8 | 128 | 1.7 |
| Embodiment 7 | 102 | 11 | 97.6 | 91 | 2.1 | 95 | 2.4 |
| Comparative Example 4 | 160 | 11 | 91.4 | 105 | 2.2 | 112 | 2.4 |

[Presence of Protrusions]

One can understand from Table 2 that the solid electrolytic capacitors in Embodiments 1~7 have excellent ESR properties, capacitance, leaked current characteristics, ESR properties after heat resistance testing and leaked current characteristics after heat resistance testing compared to the solid electrolytic capacitors in the conventional example and comparative example 1 where a plurality of protrusions comprising manganese dioxide are not formed.

The excellent ESR properties are thought to be because of the contact between the dielectric oxide film and the conductive polymer layer and the strong adhesion between the dielectric oxide film and the conductive polymer layer. To be more specific, it is thought that the method for manufacturing in Embodiments 1~7 forms protrusions comprising adhesion between the dielectric oxide film and the conductive polymer layer is strengthened and the ESR properties can be improved.

The excellent capacitance is due to the large contact area between the dielectric oxide film and the conductive polymer layer. To be more specific, with the method for manufacturing in Embodiments 1~7, since the amount of polymerization solution retained increases due to the plurality of protrusions, it is possible to improve the capacitance emergence rate (internal impregnating ability). As a result, since it is possible to increase the contact area between the dielectric oxide film and the conductive polymer layer, it is possible to improve the capacitance.

The excellent leaked current characteristics is thought to be due to the formation of a plurality of protrusions of manganese dioxide. The manganese dioxide has a high level of strength compared to the conductive polymer and due to strong stress from the outside, the leaked current characteristics are superior to the conductive polymer. As a result, it is possible to improve the leaked current characteristics with the method for manufacturing in Embodiments 1~7.

The excellent ESR after heat resistance testing and the excellent leaked current characteristics after heat resistance testing is thought to be due to an increase in the adhesion between the dielectric oxide film and the conductive polymer layer mentioned above and the difficulty in delaminating the conductive polymer layer from the dielectric oxide film due to the heat stress.

Additionally, the solid electrolytic capacitor in comparative example 1 has inferior capacitance, ESR properties, ESR properties after heat resistance testing and leaked current characteristics after heat resistance testing when compared to the solid electrolytic capacitor in the conventional example. This is thought to be due to the inability to form a good conductive polymer layer since the conductive polymer layer formation process (S4) was only performed a total of 7 times in the method of manufacture in comparative example 1.

On the other hand, when the solid electrolytic capacitor in Embodiments 1~7 were compared with the solid electrolytic capacitor in the conventional example, the capacitance, ESR properties, ESR properties after that resistance testing and leaked current characteristics after heat resistance testing were excellent. Therefore, with the method for manufacture in Embodiments 1~7, even if the conductive polymer layer formation process (S4) was only performed a total of 7 times, it is understood that a good conductive polymer layer can be formed. This is due to the increase in the amount of polymerization solution retained because of the plurality of protrusions as indicated above and an improvement in the internal impregnating ability.

(Average Diameter of the Protrusions)

The solid electrolytic capacitor in comparative example 2 had capacitance, ESR properties, ESR properties after heat resistance testing and leaked current characteristics after heat resistance testing that changed very little when compared to the solid electrolytic capacitor in the conventional example even with a plurality of protrusions (average diameters of 5 ran). This is thought to be due to the fact that the average diameter of the protrusions was 5 nm, which is very small, so there was almost no impact of the protrusions on the adhesion between the dielectric oxide layer and the conductive polymer layer or the internal impregnating ability.

So, in comparative example 2, it is thought that since the average diameter of 5 nm for the protrusions was very small, and since the relative humidity during the heat treatment process (S3-4) was 90%, which is high, the pyrolizing reaction of the manganese dioxide was delayed, due to the presence of water vapor, and the manganese dioxide was dispersed for formation.

Also, the solid electrolytic capacitor in comparative example 4 had capacitance, ESR properties, and ESR properties after heat resistance testing that changed very little when compared to the solid electrolytic capacitor in the conventional example even with a plurality of protrusions (average diameters of 160 nm). The lack of change in the capacitance was due to the fact that the average diameter of the protrusions was very large, at 160 nm, so the internal impregnating ability did not improve with the protrusions, even with an increased retention of the polymerization solution. The lack of change in the ESR properties, and ESR properties after heat resistance testing is thought to be due to the fact that the average diameters of the protrusions was too large so the adhesion between the dielectric oxide film and the conductive polymer layer did not improve (or was diminished).

On the other hand, the solid electrolytic capacitor in Embodiment 1 (protrusions with average diameters of 10 nm) or the solid electrolytic capacitor in Embodiment 7 (protrusions with average diameters of 102 nm) had excellent ESR properties, capacitance, leaked current characteristics, ESR properties after heat resistance testing and leaked current characteristics after heat resistance testing when compared to the solid electrolytic capacitor in the conventional example. Accordingly, it is understood that the average diameter of the protrusions is preferred to be 10~102 nm.

(Surface Coverage of the Protrusions)

The solid electrolytic capacitor in comparative example 3 (surface coverage of the protrusions of 29%) has inferior ESR properties and ESR properties after heat resistance testing when compared to the solid electrolytic capacitor in the conventional example. This is due to the reduction in the contact area between the dielectric oxide film and the conductive polymer layer, and by increasing the contact area between the dielectric oxide film and the plurality of protrusions comprising manganese dioxide, the detrimental impact on the ESR properties by using manganese dioxide is enhanced.

On the other hand, the solid electrolytic capacitor in Embodiment 2 (protrusions with surface coverage of 1%) or the solid electrolytic capacitor in Embodiment 6 (protrusions with surface coverage of 20%) had excellent ESR properties, and ESR properties after heat resistance testing when compared to the solid electrolytic capacitor in the conventional example. Accordingly, it is understood that the surface coverage of the protrusions is preferred to be 1~20%.

(Other)

The solid electrolytic capacitor in Embodiment 4 had excellent ESR properties, capacitance, leaked current characteristics, ESR properties after heat resistance testing and leaked current characteristics after heat resistance testing when compared to the solid electrolytic capacitor in the conventional example. Accordingly, it is understood that a manganese nitrate solution not containing a surfactant can be used in the immersion treatment process (S3-2).

The solid electrolytic capacitor in Embodiment 3 has slightly higher surface coverage of the protrusions when compared to the solid electrolytic capacitor in Embodiment 4 so it is understood that if a manganese nitrate solution containing a surfactant is used in the immersion treatment process (S3-2), the surface coverage of the protrusions increases. This is due to a decrease in the surface tension from the surfactant, which improves the internal impregnating ability of the manganese nitrate solution.

Additionally, the solid electrolytic capacitor in Embodiment 5 has excellent leaked current characteristics, and leaked current characteristics after heat resistance testing when compared to the solid electrolytic capacitor in Embodiments 1~4, 6 and 7 so it is understood that the leaked current characteristics, and leaked current characteristics after heat resistance testing are improved by performing the re-forming process to re-form the dielectric oxide layer between the protrusion forming process (S4) and the conductive polymer layer forming process (S4). This is thought to be due to repairing the defects and such in the dielectric oxide film with the re-forming process.

The abovementioned explained the preferred embodiment for the method for manufacturing a solid electrolytic capacitor and a solid electrolytic capacitor pertaining to the present invention but the present invention is not limited to the abovementioned embodiments.

For example, it is possible to change the manufacturing conditions for the relative humidity shown in the abovementioned Table 1 or the number of times performing the protrusion forming process (S3) as desired. The relative humidity in the abovementioned embodiments was a parameter to increase and decrease the average diameter of the protrusions and the number of time the protrusion forming process (S3) was performed was a parameter to increase and decrease the surface coverage of the protrusions. However, any manufacturing condition can be used to achieve the same effect as long as the protrusions comprising manganese dioxide have a coverage of 1~20% on the surface of the dielectric oxide film, and with average diameters of 10~102 nm that are formed to scatter in the shape of islands.

Additionally, chemical polymerization was performed during the conductive polymer layer forming process (S4) in each of the abovementioned embodiments, but a conductive polymer layer can be formed with a known method other than chemical polymerization such as a method to remove a solvent after being immersed in a conductive polymer solution or a solution in which a conductive polymer is dispersed. When these methods were compared with chemical polymerization, since the molecular weight of the conductive polymer was higher from the beginning, the plurality of protrusions formed on the surface of the dielectric oxide film when forming the conductive polymer layer were in a state of being stuck into the conductive polymer layer, so the maximum demonstration of the effect of the present invention is when performed with chemical polymerization. Also, in each of the abovementioned embodiments, 3,4-ethylene dioxythiophene was used as the conductive polymer but it is not limited to this, and it is possible to use generally known polythiopenes, polypyrrole, polyaniline or any of their derivatives as the conductive polymer used in the solid electrolytic capacitor.

Furthermore, in each of the abovementioned embodiments, a tantalum sintered body was used as the anode body material but it is acceptable to use a valve acting metal sintered body or a roughened valve acting metal foil such as niobium or aluminum. With valve acting metal foil, it is possible to use an aluminum foil in a thickness of 0.1 mm where the surface has been electrochemically etched.

INDUSTRIAL APPLICATION OF USE

With the present invention, it is possible to present a method for manufacturing a solid electrolytic capacitor and a solid electrolytic capacitor with excellent ESR properties.

Referring to FIG. 4 which illustrates a cross-section of a portion of an embodiment of a capacitor element 33 which may be formed according to the flow charts in FIGS. 1 and 2. A capacitor element 33 includes an anode bogy 10, an oxide film 12 that overlies the anode body 10, protrusions 14 formed on the oxide film 12, a conductive polymer layer 16 formed on the surface of the oxide film 12 and protrusions 14, and a cathode layer 18 on the conductive polymer layer 16.

The invention claimed is:

1. A solid electrolytic capacitor comprising:
a sintered molded body formed of a valve acting metal powder;
a dielectric oxide film formed on the sintered body;
a solid electrolytic layer formed on the surface of the dielectric oxide film, wherein the solid electrolytic layer comprises protrusions that cover 1 to 20% of the surface of the dielectric film and have an average diameter of 10 to 102 nanometers, wherein the protrusions include manganese dioxide, and wherein the solid electrolytic layer further comprises a conductive polymer layer formed on a surface of the protrusions and the dielectric oxide film.

2. The solid electrolytic capacitor of claim 1, wherein the conductive polymer layer includes a polymer formed by chemical polymerization.

3. The solid electrolytic capacitor of claim 1, wherein the sintered molded body includes tantalum.

4. The solid electrolytic capacitor of claim 1, wherein the conductive polymer layer includes a polymer of 3,4-ethylene dioxythiophene or a derivative thereof.

5. The solid electrolytic capacitor of claim 1, wherein the protrusions have an average diameter of 10 to 54 nanometers.

6. The solid electrolytic capacitor of claim 1, wherein the protrusions are scattered on the film in the form of islands.

7. A method for forming a solid electrolytic capacitor, the method comprising forming a solid electrolytic layer on a sintered molded body formed of a valve acting metal powder, wherein a dielectric oxide film is formed on the sintered body, wherein the solid electrolytic layer is formed by a process that comprises forming protrusions that cover 1 to 20% of the surface of the dielectric film and have an average diameter of 10 to 102 nanometers, wherein the protrusions include manganese dioxide, and forming a conductive polymer layer on a surface of the protrusions and the dielectric oxide film.

8. The method of claim 7, wherein the conductive polymer layer includes a polymer formed by chemical polymerization.

9. The method of claim 7, wherein the sintered molded body includes tantalum.

10. The method of claim 7, wherein the conductive polymer layer includes a polymer of 3,4-ethylene dioxythiophene or a derivative thereof.

11. The method of claim 7, wherein the protrusions have an average diameter of 10 to 54 nanometers.

12. The method of claim 7, wherein the protrusions are scattered on the film in the form of islands.

13. The method of claim 7, further comprising performing a reforming process between formation of the protrusions and the conductive polymer layer.

14. The method of claim 7, wherein the protrusions are formed by a process that includes pretreating the anode body in a humid environment and thereafter immersing the anode body in a manganese nitrate solution.

15. The method of claim 14, wherein the anode body is heat treated after being pretreated in the humid environment but prior to being immersed in the manganese nitrate solution.

16. The method of claim 14, wherein the manganese nitrate solution includes a surfactant.

17. The method of claim 14, wherein the humid environment has a humidity of 8 $g/m^3$ or greater.

18. The method of claim 14, wherein the humid environment has a specific relative humidity of 50% to 80%.

* * * * *